(12) United States Patent
Kelly et al.

(10) Patent No.: US 6,452,511 B1
(45) Date of Patent: Sep. 17, 2002

(54) METHOD AND SYSTEM FOR PROVIDING GROUND PROXIMITY WARNINGS

(75) Inventors: Wallace E. Kelly, Apex, NC (US); Serdar Uckun, Palo Alto, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/924,894

(22) Filed: Aug. 8, 2001

(51) Int. Cl.$^7$ ............................................... G08B 23/00
(52) U.S. Cl. ........................ 340/970; 340/961; 340/979
(58) Field of Search .................. 340/970, 977, 340/961, 963, 479; 701/9, 14, 4, 301, 120; 342/29, 65

(56) References Cited

U.S. PATENT DOCUMENTS

| | | | | |
|---|---|---|---|---|
| 4,224,669 A | * | 9/1980 | Brame | |
| 4,646,244 A | * | 2/1987 | Bateman et al. | 340/963 |
| 4,862,373 A | * | 8/1989 | Meng | |
| 4,914,436 A | * | 4/1990 | Bateman et al. | 340/970 |
| 5,086,396 A | * | 2/1992 | Waruszewski, Jr. | |
| 5,631,640 A | * | 5/1997 | Deis et al. | 340/961 |
| 6,317,690 B1 | * | 11/2001 | Gia | 340/961 |

* cited by examiner

Primary Examiner—Brent A. Swarthout
(74) Attorney, Agent, or Firm—Nathan O. Jensen; Kyle Eppele

(57) ABSTRACT

A conditional TAWS algorithm system and method for providing advanced warnings of potential CFIT situation which could result from predictable errant course changes.

16 Claims, 2 Drawing Sheets

METHOD AND SYSTEM FOR PROVIDING GROUND PROXIMITY WARNINGS

CROSS REFERENCE TO RELATED APPLICATIONS

This application relates to an application entitled "TERRAIN AWARENESS SYSTEM HAVING NUISANCE ALARM FILTER FOR USE DURING APPROACH" by Wallace Kelly and Serdar Uckun, and also relates to another application entitled "CONDITIONAL HAZARD ALERTING DISPLAY", by the same inventors, both of said applications being filed concurrently herewith and assigned to a common assignee, said applications being incorporated herein in their entirety by this reference.

FIELD OF THE INVENTION

The present invention generally relates to avionics, and more particularly relates to ground proximity warning systems, and even more particularly relates to methods and systems for early notification of potential controlled flight into terrain (CFIT).

BACKGROUND OF THE INVENTION

In recent years, much effort has been expended in reducing CFIT accidents. Enhanced Ground Proximity Warning Systems (EGPWS) have been used in the industry which combine some of the features of early "ground prox" systems with GPS positioning and terrain databases.

While these EGPWSs have been used extensively in the past, they do have some drawbacks. These EGPWSs still are reactive systems in the sense that they react to the current heading, velocity, altitude, and position of the aircraft. They do not anticipate that the aircraft might make an abrupt change in heading during flight, which would then trigger an alarm, but would not provide sufficient advance warning for the pilot to make a well-reasoned corrective action.

Consequently, there exists a need for improved methods and systems for providing advance warnings of potential CFIT situations in an efficient manner.

SUMMARY OF THE INVENTION

It is an object of the present invention to provide a system and method for providing advance warning of potential CFIT situations in an efficient manner.

It is a feature of the present invention to utilize an algorithm in terrain awareness warning systems (TAWS) which anticipates that a pilot might make a course change at some point along a projected flight plan.

It is another feature of the present invention to anticipate both planned and errant course changes.

It is an advantage of the present invention to achieve improved efficiency providing advanced warning of potential CFIT situations.

The present invention is an apparatus and method for providing advanced warning of potential CFIT situations, designed to satisfy the aforementioned needs, provide the previously stated objects, include the above-listed features, and achieve the already articulated advantages. The present invention is carried out in an "untimely warning-less" manner in a sense that the potential for warnings to be issued without sufficient time for the pilot to make a well-reasoned response has been greatly reduced.

Accordingly, the present invention is a system and method including an algorithm which considers potential future course changes when generating terrain awareness warnings.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
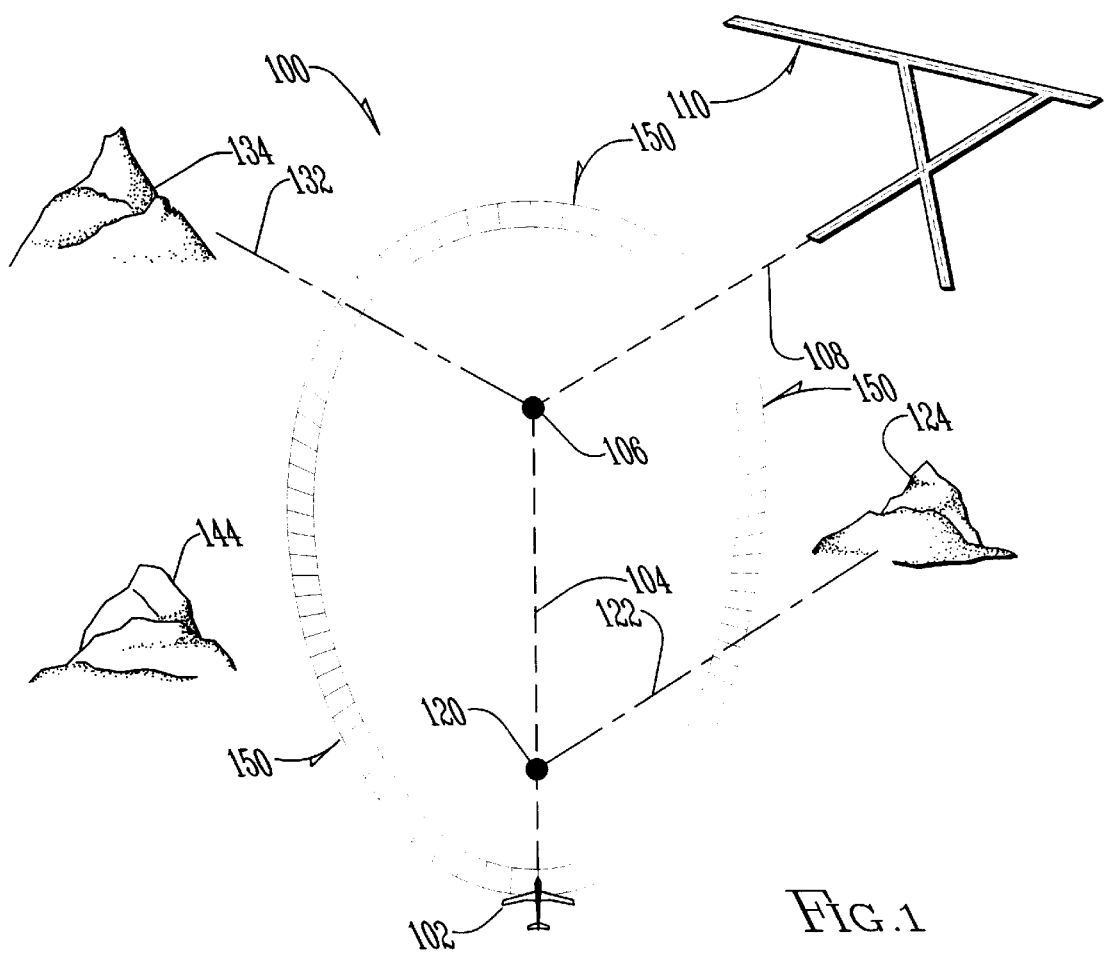
FIG. 1 is a bird's eye view of a situation of an application of the method and system of the present invention, where the dashed lines represent desired flight path and the dotted and dotted/dashed lines represent errant flight paths.

Now referring to the drawings wherein like numerals refer to like matter throughout, and more specifically referring to FIG. 1, there is shown a geographic representation of a situation for use of the method and system of the present invention generally designated 100, including a conditional TAWS protected aircraft 102 having a conditional TAWS 200 (FIG. 2) on-board. Conditional TAWS protected aircraft 102 is shown progressing along desired flight path first leg 104 with a heading appropriate for desired course change location 106 where the pilot or autopilot will make a course change and then fly along desired flight path final approach leg 108 to reach destination airport 110. Third terrain object 144 is located at such a position with respect to destination airport 110 as to prohibit an extended straight-line approach to destination airport 110. Because of third terrain object 144, conditional TAWS protected aircraft 102 makes this "dog leg right" approach. Prior art EGPWSs utilize current location, heading and velocity information of an aircraft to generate warnings. An aircraft equipped with a prior art EGPWS may not give any indication of the danger about the aircraft so long as the aircraft stays on its desired flight path or within a safety envelope 150. In other words, prior art EGPWSs are reactive to the current location and flight parameters. When an aircraft is flying along desired flight path first leg 104, there is no terrain object ahead which would trigger an alarm. Note: this assumes that the location, size and shape of first terrain object 124, second terrain object 134 and third terrain object 144 are such that they would not trigger a prior art EGPWS; i.e., they are not within the safety envelope 150. In some prior art EGPWS, GPWS, GCAS or TAWS systems, the alert function depends on a scalable zone around each terrain object. The size of the warning zone assigned to each object is dynamic and depends upon the speed of the aircraft and possibly other flight parameters. In this FIG. 1, the pilot is flying a somewhat challenging approach, and a typical prior art EGPWS would not give any indication of a potential for a problem so long as the proper flight path is followed. However, if the pilot were to make a mistake in a heading change along the desired flight path first leg 104, a potential CFIT situation could arise. However, because of the close proximity of the first terrain object 124, second terrain object 134 and the third terrain object 144, a warning (a reactive warning) given after the mistake has already been made may not give the pilot sufficient time in which to take well-reasoned corrective actions. The conditional TAWS protected aircraft 102 includes a conditional TAWS 200 (FIG. 2) which is proactive and attempts to anticipate potential for CFIT situations which could result from errant actions of the pilot or autopilot system. The conditional TAWS protected aircraft 102 would anticipate a premature heading and course change as is depicted by first CFIT flight path 122. In this potential CFIT situation, the pilot makes a mistake and executes the correct, or substantially correct heading change, but does it prematurely. The conditional TAWS protected aircraft 102 provides a visual and/or aural notification of a potential CFIT situation before the conditional TAWS protected aircraft 102 reaches location of premature course change 120. This early notification of potential CFIT situations may be enough to avoid the error in the first place, or it may give the pilot an advance indication of what could be a reasonable corrective action if a TAWS alert were to occur.

Also shown in FIG. 1 is another potential CFIT situation, where the pilot is not premature in the heading change, but turns left instead of right. Second CFIT flight path 132 represents such an errant heading/course change from desired course change location 106 and a potential CFIT with respect to second terrain object 134. Numerous other potential CFIT situations could exist and are intended to be anticipated by the conditional TAWS protected aircraft 102.

Figure 2:
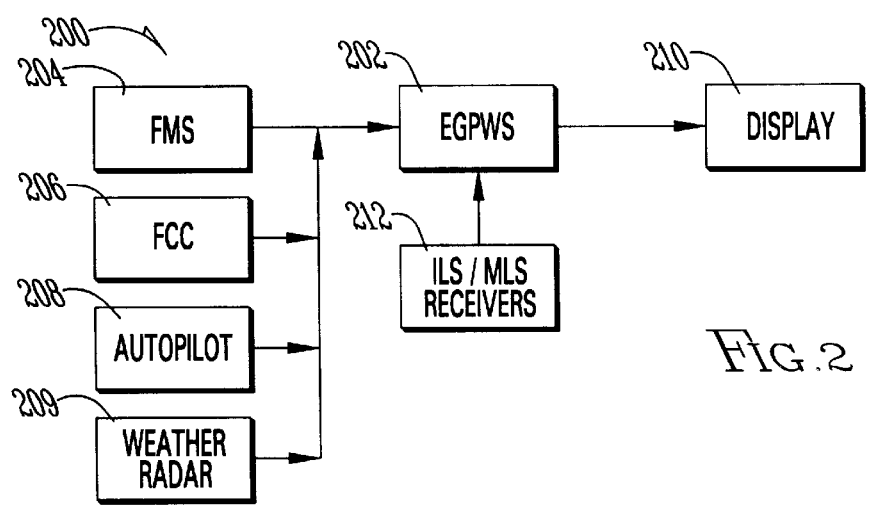
FIG. 2 is a block diagram view of a system of the present invention.

A more detailed understanding of the present invention can be achieved by now referring to FIG. 2, which shows a conditional TAWS 200 of the present invention, which is assumed to be disposed on conditional TAWS protected aircraft 102 of FIG. 1. Conditional TAWS 200 includes a new EGPWS 202 which is similar to well-known prior art EGPWSs except that it has an algorithm and functionality to generate TAWS warnings based upon anticipated errant actions of a pilot or autopilot such as described above in FIG. 1, and it makes determinations of prohibited heading/course deviations at various points along a projected flight path. EGPWS 202 may be similar to EGPWSs previously sold by Sundstrand and currently sold by Honeywell. Such a conditional TAWS 200 will not only include the EGPWS 202, but it will also include data input from flight management systems (FMS) 204, flight control computer (FCC) 206, and autopilot 208, which can individually or collectively provide information which the EGPWS 202 can use to predict times and positions where a pilot might make an errant change in heading/course which would or could result in CFIT and a warning.

In one embodiment of the present invention, the conditional TAWS 200 continuously calculates prohibited immediate heading/course changes; i.e., heading/course changes which, if made immediately, would result in an immediate issuance of a TAWS warning under prior art TAWS systems. Then a visual or aural indication of the current prohibited headings or changes in headings will be provided to the pilot.

Conditional TAWS 200 includes a display 210 which could be similar to that which is described in co-pending applications entitled "TERRAIN AWARENESS SYSTEM HAVING NUISANCE ALARM FILTER FOR USE DURING APPROACH" and "CONDITIONAL HAZARD ALERTING DISPLAY" filed concurrently herewith and assigned to the same assignee. This display gives a pilot an instantaneous display of the heading changes which are "prohibited." Numerous other instantaneous displays of prohibited heading changes are contemplated as well. It should be noted that the pilot could be provided with an indication of headings and/or climb rates which are permitted. The OK heading or climb rate can be an absence of prohibitions, or it can be an affirmative marking, such as a green band, etc. In such situations, the pilot can make course adjustments toward the clear headings or in the case of OK climb rates, it gives the pilot a quick indication of how much climb is required to avoid a hazard.

In another embodiment of the present invention, the conditional TAWS 200 makes similar calculations, not based upon current location, heading, and velocity, but for future positions along the flight plan or projected flight path. Future potential terrain hazards (i.e., those hazards which would not normally result in an alarm unless the aircraft were to make an abrupt change from its current heading) can then be determined and either superimposed on the known flight plan or be indicated about the displayed flight path as prohibited heading changes.

Figure 3:
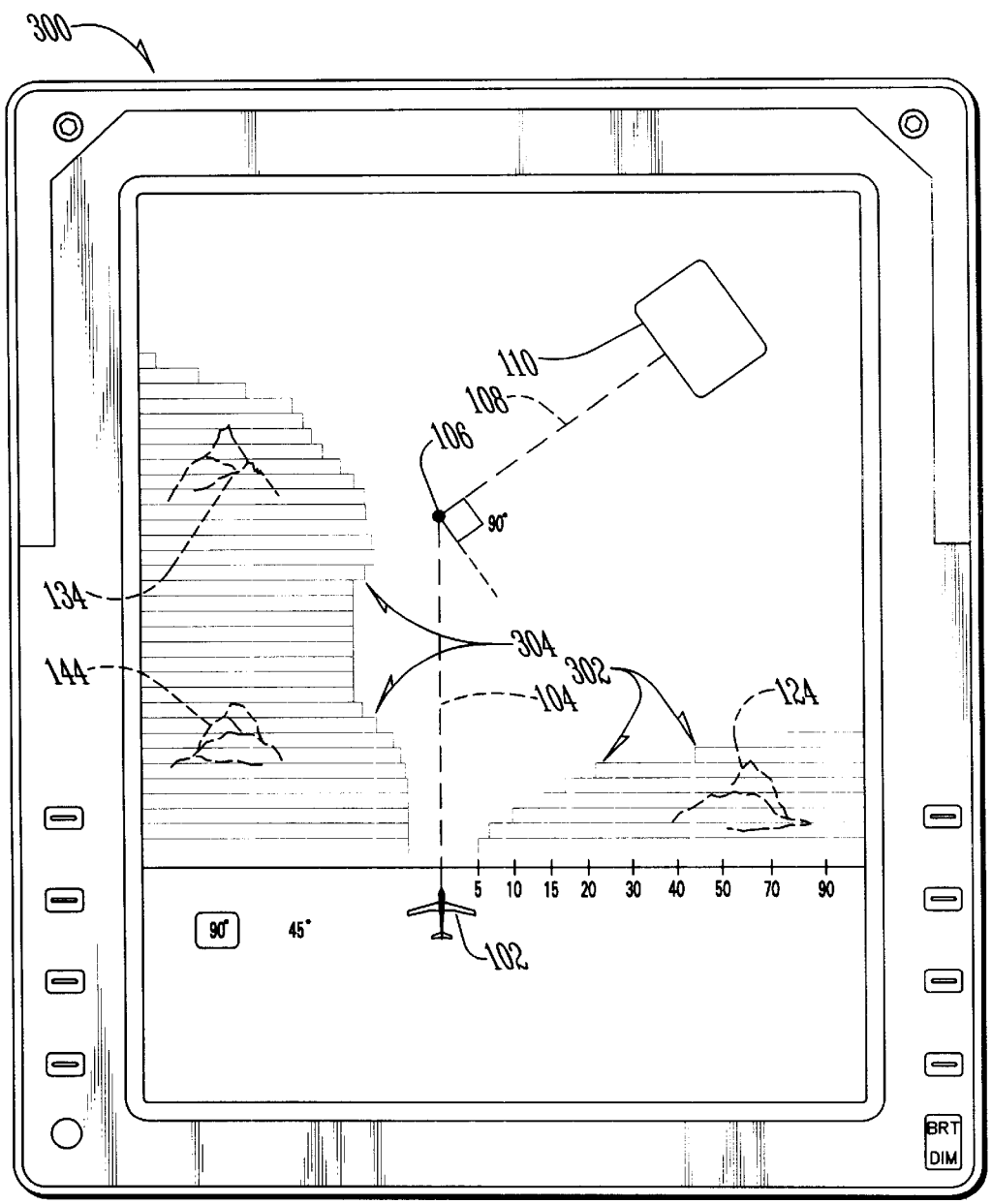
FIG. 3 is a map display of the present invention showing lateral bars which depict prohibited heading deviation angles at all points along the flight path.

Now referring to FIG. 3, there is shown just one example of many possible examples of how a pilot might be provided with information relating to future prohibited heading deviations. FIG. 3 depicts a map display showing route information, such as used in combination with an FMS. The display includes right prohibited heading deviation bars 302 and left prohibited heading deviation bars 304. These bars are drawn with respect to the terrain of FIG. 1. As the conditional TAWS protected aircraft 102 progresses along the desired flight path first leg 104, the amount of non-prohibited deviation is small; i.e., the aircraft is flown through a narrow corridor. As conditional TAWS protected aircraft 102 continues along the desired flight path first leg 104, the right prohibited heading deviation bars 302 become shorter as the aircraft passes first terrain object 124 (shown in dashed lines). The left prohibited heading deviation bars 304 remain fairly long owing to the third terrain object 144 and second terrain object 134. Once the conditional TAWS protected aircraft 102 makes its planned heading change at desired course change location 106, the left prohibited heading deviation bars become shorter and then disappear as the conditional TAWS protected aircraft 102 approaches the destination airport 110.

In operation, the apparatus and method of the present invention as described in FIGS. 1 and 2, could function as follows:

1. An algorithm is used to generate TAWS alerts based upon the current position, velocity, and heading of the aircraft, as well as other factors.
2. A current determination is made as to whether an alert would be issued if the heading of the aircraft were to change by a predetermined amount.
3. This determination is repeated for several different prospective heading deviation amounts.
4. A notification is provided to the pilot to suggest that certain immediate heading deviations are undesirable.
5. A prediction of the aircraft's future position along the current flight plan is made.
6. A predicted determination is made for a series of predicted positions along the flight plan, as to whether alerts would be issued if the current heading were to deviate over a predetermined range of deviations.
7. A notification is provided to suggest that at points along the flight path certain headings or heading changes may be undesirable.

Throughout this description, reference is made to EGPWS, TAWS, GCAS, GPWS and ground prox, because it is believed numerous names have been used in the industry to label the various systems and proposed systems for giving a pilot a warning of a potential CFIT situation. It is the intention of the present invention that any such system for providing advance CFIT warnings would benefit from the present invention.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. An apparatus for assisting in reducing controlled flight into terrain, the apparatus comprising:

a ground proximity warning system that is adapted and configured to provide warnings to a pilot of possible controlled flight into terrain situations based on at least current position, current speed and current heading of an aircraft said ground proximity warning system further making a current determination of a plurality of heading deviations from said current heading that result in a warning being issued by said ground proximity warning system if such heading deviations occur; and a display adapted and configured for displaying to a pilot a plurality of prohibited headings that result in a warning by said ground proximity warning system if said prohibited heading becomes said current heading.

2. An apparatus of claim 1 wherein the ground proximity warning system further identifies a first anticipated position along a projected flight path of an aircraft and makes a first anticipated determination of a plurality of heading deviations from said current heading that results in a warning being issued by said ground proximity warning system if such heading deviations occur and said aircraft is located at said anticipated position.

3. An apparatus of claim 2 wherein said display further displays a first anticipated plurality of prohibited headings that result in a warning if said first anticipated plurality of prohibited headings become said current headings.

4. An apparatus of claim 3 wherein said ground proximity warning system provides warnings based upon current heading.

5. A method of reducing controlled flight into terrain comprising the steps of:

providing warnings to a pilot of possible controlled flight into terrain with a ground proximity warning system;

making a determination of potential headings that result in a warning being issued by said ground proximity warning system if an aircraft's current heading changes to said headings; and displaying to the pilot a plurality of prohibitions that are based upon said determination.

6. A method of claim 5 wherein said prohibitions include prohibited headings.

7. A method of claim 5 wherein said prohibitions include prohibited heading deviations.

8. A method of claim 5 further comprising the step of predicting an aircraft's position along a flight plan and for that position making a predicted determination of potential headings that result in a warning being issued by said ground proximity warning system if an aircraft's current heading changes to said potential headings.

9. A method of claim 8 further comprising the step of displaying a plurality of predicted prohibitions based upon said predicted determination.

10. A method of claim 9 wherein said predicted prohibitions are prohibited heading deviations.

11. A terrain awareness warning system comprising:

a ground proximity warning system that is adapted and configured to generate warnings based upon current speed, current heading and current location of a protected aircraft;

means for making a determination of potential headings that result in a warning being issued by said ground proximity warning system if a current heading of said protected aircraft changes to said potential headings; and displaying to the pilot a plurality of prohibitions that are based upon said determination.

12. A system of claim 11 wherein said means for making is an algorithm executed by said ground proximity warning system.

13. A system of claim 11 wherein said display depicts said prohibitions as variable length bars disposed about a line representing a projected flight path.

14. A system of claim 11 wherein said means for making a determination is further adapted and configured for predicting a position of said protected aircraft in a predicted flight path, for making a predicted determination for said predicted position of potential headings that results in a warning being issued by said ground proximity warning system if a current heading of said protected aircraft changes to said headings.

15. A system of claim 14 wherein said means for making a determination is an algorithm executed by said ground proximity warning system.

16. A system of claim 15 wherein said algorithm is a portion of software used by said ground proximity warning system to generate warnings.

* * * * *